United States Patent [19]

Okayama

[11] Patent Number: 4,754,427
[45] Date of Patent: Jun. 28, 1988

[54] LINKING SYSTEM FOR PROGRAMMABLE CONTROLLER

[75] Inventor: Yoshihiko Okayama, Numazu, Japan

[73] Assignee: Toshiba Kikai Kabushiki Kaisha, Tokyo, Japan

[21] Appl. No.: 817,912

[22] Filed: Jan. 10, 1986

[30] Foreign Application Priority Data

Jan. 11, 1985 [JP] Japan .................... 60-3045

[51] Int. Cl.[4] ................ G06F 15/16; G06F 15/46
[52] U.S. Cl. .................... 364/900; 364/132
[58] Field of Search ... 364/900 MS File, 200 MS File, 364/132

[56] References Cited

U.S. PATENT DOCUMENTS

| | | | |
|---|---|---|---|
| 4,123,794 | 10/1978 | Matsumoto | 364/132 |
| 4,228,495 | 10/1980 | Bernhard et al. | 364/200 X |
| 4,249,172 | 2/1981 | Watkins et al. | 364/900 X |
| 4,304,001 | 12/1981 | Cope | 364/132 X |

Primary Examiner—Thomas M. Heckler
Attorney, Agent, or Firm—Koda and Androlia

[57] ABSTRACT

In a programmable controller linking system, a plurality of programmable controllers are connected to one master controller and sequences of the programmable controllers are programmed using addresses representing optional input/output memory areas. Link tables are prepared by automatically allotting input/output memory areas of the programmable controllers, to the inner relays, with respect to addresses of the respective programmable controllers except for the subject programmable controller, the thus prepared link tables are registered in the master controller, and all the link tables are collected from the respective programmable controllers in the master controller at the link starting time to prepare an editorial link table by collecting common portions of the collected link tables. The input/output side address tables are provided for the master controller and for the respective programmable controllers so that the data is periodically accessed and linked between the master controller and the respective programmable controllers in accordance with the input/output side address tables.

14 Claims, 6 Drawing Sheets

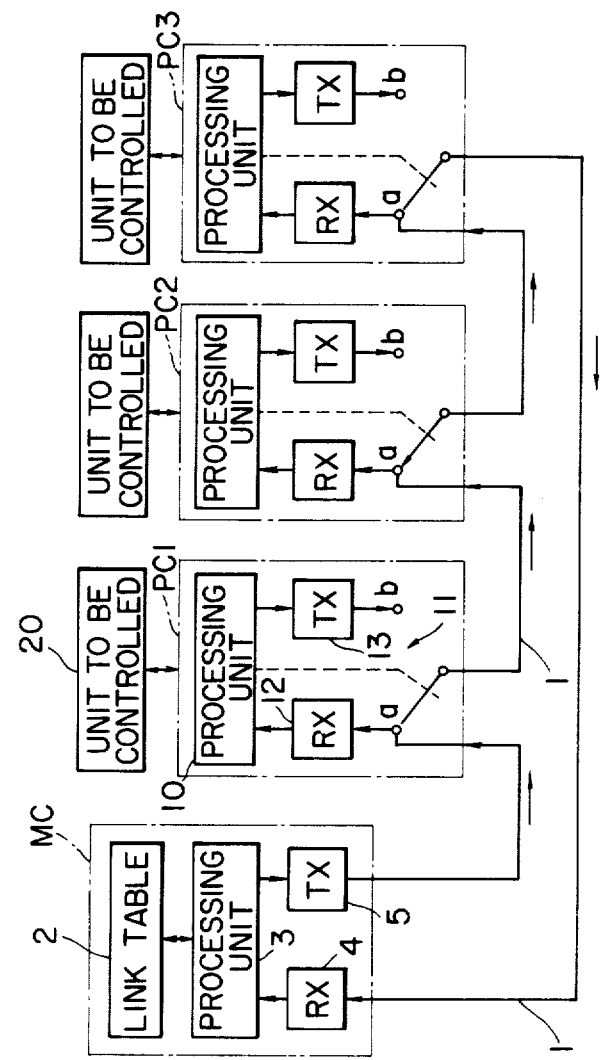
F I G. 4

FIG. 7

| PCNO | TRANSFER ORIGIN ADDRESS | TRANSFER DESTINATION PCNO | ADDRESS |
|---|---|---|---|
| 0 | X010 | — | E000 |
| 2 | X000 | — | E001 |
| 0 | Y050 | — | E003 |
| ---- | ---- | ---- | ---- |

INPUT

| PCNO | ADDRESS | PCNO | ADDRESS |
|---|---|---|---|
| — | E002 | 3 | R000 |
| — | E004 | 4 | Y060 |

OUTPUT

| PCNO | TRANSFER ORIGIN ADDRESS | TRANSFER DESTINATION PCNO | ADDRESS |
|---|---|---|---|
| 1 | X000 | 0 | E000 |
| 2 | X000 | 0 | E001 |
| 3 | R000 | 0 | E002 |
| ---- | ---- | ---- | ---- |

INPUT

| PCNO | ADDRESS | PCNO | ADDRESS |
|---|---|---|---|
| 0 | E003 | 6 | Y050 |

OUTPUT

FIG. 8

| POINTER ON-OFF INF. OF POINTER | TRANSFER ORIGIN | | TRANSFER DESTINATION | | | | | | | |
|---|---|---|---|---|---|---|---|---|---|---|
| | PCNO | ADDRESS | PCNO | ADDRESS | PCNO | ADDRESS | PCNO | ADDRESS | PCNO | ADDRESS |
| 0 | 1 | X000 | 0 | E000 | 3 | E004 | | | | |
| 1 | 2 | X000 | 0 | E001 | 1 | E001 | 4 | E007 | | |
| 2 | 3 | R000 | 0 | E003 | 3 | E005 | 4 | E002 | 6 | E010 |
| 3 | 0 | E003 | 6 | Y053 | | | | | | |
| 4 | 0 | X010 | 1 | E000 | 2 | E001 | 3 | E002 | | |

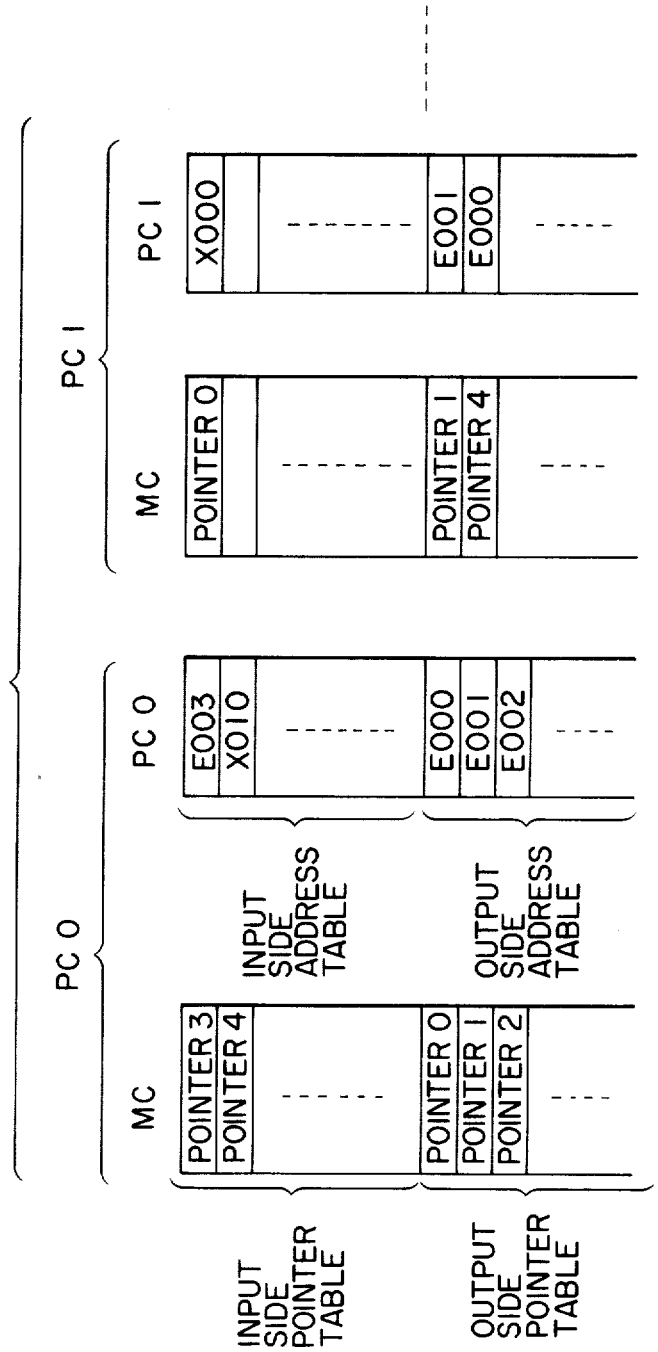

LINKING SYSTEM FOR PROGRAMMABLE CONTROLLER

BACKGROUND OF THE INVENTION

This invention relates to a data linking system for a plurality of programmable controllers.

Recently, a programmable controller, or sequence controller, has been widely utilized for working, assembling, deliverying and the like operations of a machine control with the development of computer utilizing techniques. With these operative controls, only one programmable controller controls the whole system in a conventional system of this field of art, but it has become impossible to control the whole system with one programmable controller because of the requirements of high performance and high speed operation based on the increasing size and the intricacy of the system. Ont the basis of these techncial requirements, a plurality of programmable controllers have been recently installed for a large system provided with an intricated structure so as to carry out separately group control thereof. With the separate type control system, since it is necessary to establish an interlocking relationship between separate programmable controller groups, data linking means therebetween has been required.

FIGS. 1 and 2 represent examples of a data linking system using a conventional technique in which FIG. 1 represents the manner of linking for a parallel link provided by mutually connecting a plurality of programmable controllers PC1, PC2, PC3, . . . PCN. In order to establish the data link between optional programmable controllers PC1 to PCN in this manner, memory areas MA1 to MAN provided for respective input/output areas, or inner relays or the like of the programmable controllers are split into N numbers of memory area groups which are to be allocated to the respective programmable controllers thereby to establish the fixed link therebetween in which the memory areas MA1 to MAN can always accurately correspond to the programmable controllers, respectively. However, in this linking manner, since memory areas each having the same capacity are allocated to the respectively corresponding programmable controllers regardless of the frequency of the linkings, this manner does not economically utilize the hardware, and may cause a case where memory areas which are not substantially utilized are provided when the frequency of the linking is low, thus being not economical. In addition, in a case where a large number of the programmable controllers constituting a system are to be provided, the whole memory capacity therefor is extremely increased as well as increasing the number of memory areas actually substantially not utilized. This will cause time loss in the data transferring time. In order to eliminate this problem, when the memory areas are made small, the link between the respective programmable controllers are freely established. Moreover, since the fixed area type of link is adapted, it is necessary to arrange the sequence programs so as to input or output signals into or from the predetermined memory areas. This may cause a loss in the programming operation.

FIG. 2 represents another type of linking in which a plurality of programmable controllers PC1 to PCN are operatively connected to one master controller MC which is provided with a memory area MA including all link areas of the respective program memories and the memory area MA is allocated to the link areas of the programmable controllers, respectively. According to this arrangement, it is possible to establish the linking of all the programmable controllers PC1 to PCN through the master controller MC, but the direct linking between the respective programmable controllers PC1 to PCN is prohibited. In addition, the linking is performed through the memory area MA of the master controller MC, so that the number of the linking means are naturally limited.

SUMMARY OF THE INVENTION

An object of this invention is to eliminates problems and disadvantages encountered in the prior art technique and to provide an improved linking system for programmable controllers capable of linking optional memory areas of the programmable controllers regardless of the number used and saving the data transferring time by linking only the memory areas actually used in accordance with a sequence program.

According to this invention, this and other objects can be accomplished by providing a linking system for a plurality of programmable controller provided with inner relays for the linking respectively characterized in that the respective programmable controllers are connected to one programmable controller controlling the aforementioned programmable controllers as a master controller, sequences of the programmable controllers are programmed using addresses representing optional input/output memory areas, link tables are prepared by automation allotting input/output memory areas of the programmable controllers, to the inner relays, with respect to addresses of the respective programmable controllers except for the address of the subject programmable controller, the prepared link tables is registered into the master controller, the link tables are collected from the respective programmable controllers into the master controller at the start of linking to prepare an edited link table by collecting common portions of the collected link tables, input side and output side address tables are provided for the master controller and the respective programmable controllers, respectively, so that the linking is performed only by the transfer of data and the data is periodically accessed and linked between the master controller and the respective programmable controllers in accordance with the input side and output side address tables by the operation of the programmable controllers.

The nature, principle and utility of the invention will become more apparent from the following detailed description when read in conjunction with the accompanying drawings.

BRIEF DESCRIPTION OF THE DRAWINGS

In the accompanying drawings:

FIG. 4 is a block diagram showing the construction of the master controller and the programmable controllers according to this invention;

FIG. 7 shows one example of a link table for the programmable controller;

FIG. 8 shows one example of an edited link table for the master controller; and

FIG. 9 shows an example of a pointer table and an address table for the programmable controller.

DESCRIPTION OF THE PREFERRED EMBODIMENTS

The linking system for a plurality of programmable controllers according to this invention will be described in conjunction with FIGS. 3 to 9.

Figure 1:
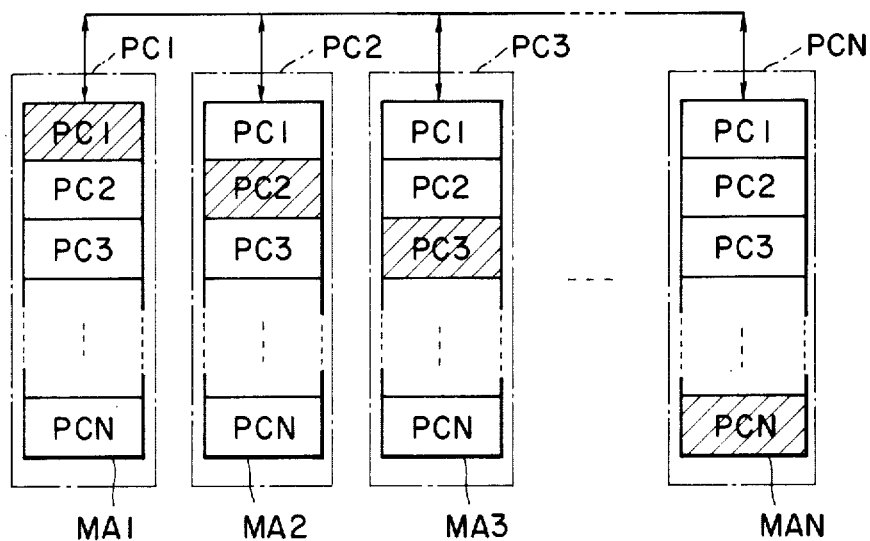
FIGS. 1 and 2 are schematic diagrams showing examples of a conventional data linking system.
Figure 2:
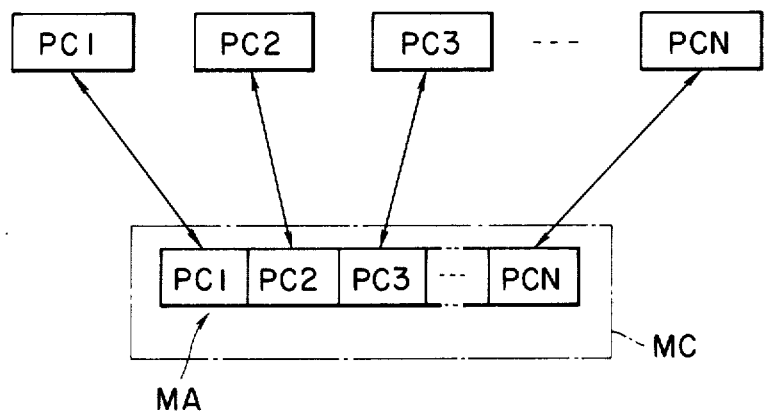
Figure 3:
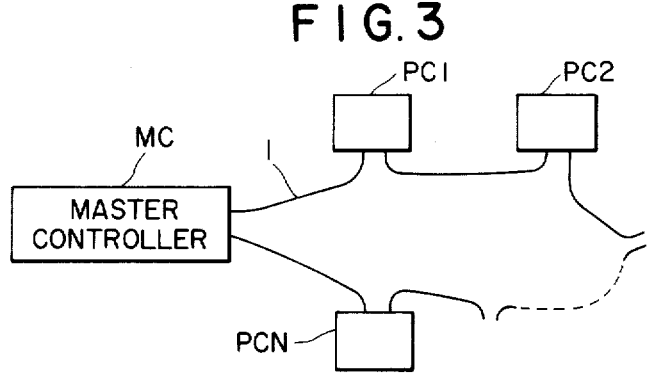
FIG. 3 is a connection diagram according to this invention showing the connection between a master controller and a plurality of programmable controllers.

Referring to FIG. 3 in which a plurality, i.e. N in number, of programmable controllers PC1 to PCN are operatively connected to one master controller MC by means of a light loop which is formed with optical fibers 1. The programmable controllers PC1 to PCN control predetermined portions or units in the whole system and the flow of the control in the whole system is preliminarily determined so that the data link between the respective programmable controllers PC1 to PCN can be made together with the designing of the whole system.

FIG. 4 shows an example in which three programmable controllers PC1 to PC3 are connected to the master controller MC in a loop form by means of the optical fibers 1. The master controller MC is provided with an edited link table 2, described in detail hereinafter, and a processing unit 3 carrying out the necessary data processing using a micro computer, etc. Information transferred from the optical fibers 1 is converted by the receiver 4 into an electric signal which is then inputted into the processing unit 3. The information from the processing unit 3 is converted by a transmitter 5 into a light signal which is then transferred to the optical fibers 1. Since the programmable controllers PC1 to PC3 have the same construction, the construction of the programmable controllers PC1 will only be explained hereunder for convenience sake.

Figure 5:
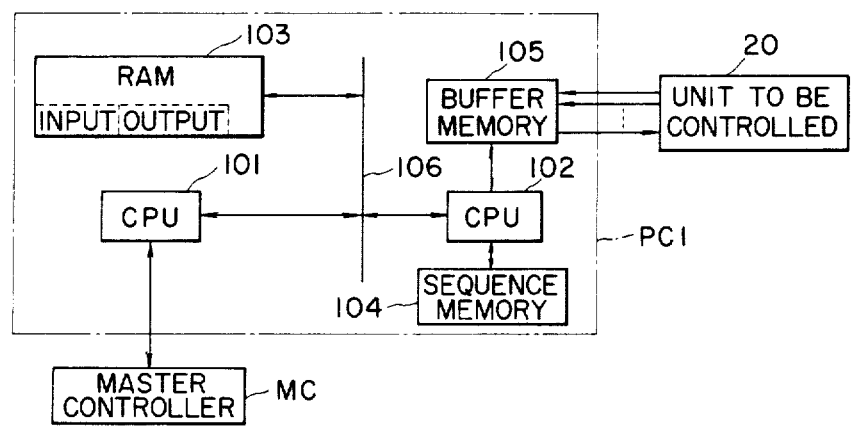
FIG. 5 is a block diagram showing the construction of the processing unit of the programmable controller shown in FIG. 4.

The programmable controller PC1 is provided with a processing unit 3 having the construction shown in detail in FIG. 5. The information transferred through the optical fibers 1 is converted by a receiver 12 into an electric signal which is then inputted into a processing unit 10 as shown in FIG. 4 and the information from the processing unit 10 is converted by a transmitter 13 into a light signal to be outputted therefrom. A switching unit 11 provided with contacts a and b is located at the junction points of the optical fibers 1 of the programmable collector PC1 and the optical fibers 1 are usually connected to the contact a as shown in FIG. 4 so that the information from the optical fibers 1 is transferred to the receiver 12 and the succeeding programmable controllers PC2 and PC3 and is then returned to the receiver 4 of the master controller MC. The switching unit 11 is thereafter switched by the processing unit 10 and when the connection to the contact a is established with the contact b, the information to be inputted into the programmable controller PC1 is interrupted and the information outputted from the transmitter 13 is transferred to the optical fibers 1. The programmable controller PC1 is connected to a unit 20 to be controlled so as to output signals to an electromagnetic valve, a relay contact, a display lamp and the like of the unit 20 and to receive signals from a push button, a limit switch, a relay and the like in the unit 20.

The schematic construction of the processing unit 10 such as in the programmable controller PC1 is described hereunder with reference to FIG. 5. The processing unit 10 is provided with a CPU (central processing unit) 101 such as a micro processor which controls the data transfer between the procesing unit 10 and the master controller MC and with a CPU 102 which controls the data transfer between the processing unit 10 and the unit 20 to be controlled. The CPUs 101 and 102 are operatively connected to a common RAM (random access memory) 103 through a bus line 106. A sequence memory 104 storing a program with respect to the unit 20 is operatively connected to the CPU 102 so as to transmit and receive data and instructions through a buffer memory 105 between the CPU 102 and the unit 20 to be controlled. The RAM 103 is provided wtih a storage area (i.e. input area) for storing information transferred from another programmable controller linked to the RAM 103 and with a storage area (i.e. output area) for storing information of the subject programmable controller PC1 so as to transfer that information to the other programmable controller through the master controller MC. The transfer between the buffer memory 105 and the RAM 103 is controlled by the CPU 102 and the transfer between the subject programmable controller PC1 and the other programmable controller is controlled by the CPU 102.

FIG. 8 shows a sequence program for the data using a memory area such as optional input/output areas or inner relays of an optional programmable controller PC according to this invention. A necessary sequence for the operation of each programmable controller PC is first programmed with respect to the programmable controller PC using the optional input/output areas of the optional programmable controller PC. Next, for the preparation of a link table, the respective programmable controllers PC, as a portion from which the data is transferred (called transfer origin hereinafter) automatically allocates the input/output areas of the programmable controllers PC other than the subject one to the inner relays for the data link as shown in FIG. 8. FIG. 8 shows one example of the sequence program representing the number of the programmable controllers, the contents to be processed, and the processing addresses of the respective programmable controllers to be linked with respect to the programmable controllers PC0 and PC1 and the inner relays for the data link allocated to the respective sequences.

Figure 6:
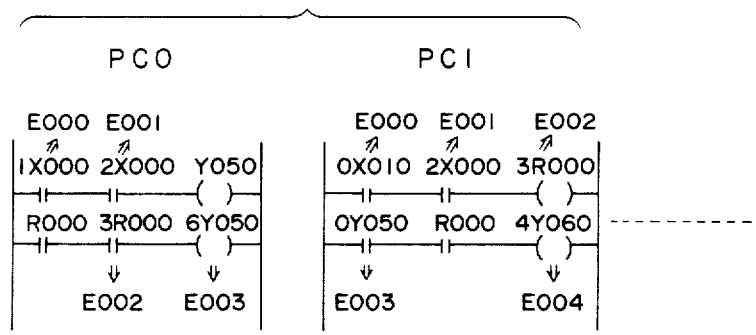
FIG. 6 shows one example of a sequence program utilized for the data linking system according to this invention.

In FIG. 6, the symbols "X" represents the input, "Y" the output, "R" the inner relay and "E" represents the inner relay for the link, and for example, with the programmable controller PC0, a symbol "1X000" represents the address "000" of the input of the programmable controller PC1 and is allocated in the address "000" of the inner relay for the link. A symbol "Y050" represents the address "050" of the output of the programmable controller PC0 itself and is not allocated into the inner relay for the link. A symbol "3R000" represents the address "000" of the inner relay of the programmable controller PC3 and is allocated into the address "002" of the inner relay for the linking.

FIG. 7 shows link tables of the respective programmable controllers. These link tables are prepared before the starting of the linking operation in preparation of editting the final link table in the master controller to clarify the transfer origin and the portion to which the data is transferred (called transfer destination hereinafter) with respect to the input and output sides, respectively. The link tables prepared for the respective programmable controllers are registered into the master controller after the preparation of the link tables. On the input side of the link tables, the number, the content and the addresses of the programmable controller as the transfer origin are collected in a table in accordance with the order of the addresses of the inner relay for the link with respect to the programmable controllers as the transfer destination. On the output side of the link tables, the addresses of the programmable controller into which the data is transferred in accordance with the order of the addresses of the inner relay for the link with respect to the programmable controller as the data transfer origin.

FIG. 8 shows a part of an edited link table in the master controller, which operates to collect link tables prepared in the respective programmable controllers which have already been accommodated in the master controller at the start of data linking and to prepare an edited link table by combining addresss of the programmable controllers to which the data is transferred and which are provided with addresses of the programmable controllers as the transfer origins commonly in accordance with the order of the addresses. The data link conditions between the respective programmable controllers can be immediately recognized by monitoring the master controller utilizing the thus prepared edited link table. For example, with reference to FIG. 8, it will be understood that the address "X000" of the programmable controller C1 as the data transfer origin is linked with the addresses "E000" and "E004" of the programmable controllers PC0 and PC3, respectively, as the data transfer destination.

Furthermore, in order to accomplish the data transfer between the respective programmable controllers by one linking operation, the editorial link table of the master controller is provided with pointers for designating the address of an area into which is stored data to be accessed and a pointer table consisting of ON-OFF information of the pointers. In this connection, each of the respective programmable controllers is provided therein with input side and output side address tables in accordance with the input side and output side pointer tables of the master controller as shown in FIG. 9. For example, the input side pointers are pointers "0", "1", "2", and "4" and the output side pointer is a pointer 3 as shown FIG. 8. This means that only memory areas of the programmable controllers which are actually utilized as is indicated by the pointers are linked.

During the data link operation, the master controller operates to write the information from the programmable controllers in the ON-OFF area of the edited link table shown in FIG. 8 in accordance with the order of the pointers of the input side pointer table, to read out the data from the edited link table in FIG. 8 in accordance with the order of the pointers of the output side pointer table, and then to transfer the read-out data into the area of the programmable controller the address which is designated by the pointer. In connection with the operation of the master controller, each of the respective programmable controllers operates to read out the data in accordance with the order of the input side address table of FIG. 9, to transfer the read-out data into the master controller, and then to write the data transferred from the master controller into the input/output areas or inner relay with the address number of the output side address table. In the data transfer between the master controller and the programmable controllers, the number of the programmable controller is feed before the data transfer to respond only to the designated programmable controller.

According to the linking system of this invention utilizing the link table and the pointer of the type described hereinbefore, a programmable sequence can be programmed by utilizing input/output areas of optional ones of the respective programmable controllers thereby to link only the actually required areas, thus saving the data transfer time. Accordingly, the programmable controllers can be linked with no limit in the number of links and optional areas of optional programmable controllers can be linked with the shortest possible time. In addition, a sequence program requiring the link between the programmable controllers can easily be prepared without paying specific attention to the memory areas of the programmable controllers.

It should be understood that many modifications and adaptations of the invention will become apparent to those skilled in the art and it is intended to encompass such obvious modifications and changes in the shape of the claims appended hereto.

What is claimed is:

1. A linking method for a plurality of programmable controllers which respectively have inner elements for linking, which comprises the steps of:
   connecting said respective programmable controllers to one master controller for transferring data;
   programming a sequence of said respective programmable controllers by using addresses of optional input/output areas in optional ones of said programmable controllers;
   automatically allotting the inner elements with respect to addresses of programmable controllers except for a subject programmable controller in said sequence by means of said respective programmable controllers;
   preparing link tables containing addresses from which the data is transferred and into which the data is collected for an input side and an output side;
   storing the prepared link tables in said master controller;
   preparing an edited link table collecting common addresses into which the data is transferred with respect to addresses of said link tables from which the data is transferred at a beginning time of linking operation with said master controller and said programmable controllers;
   preparing a pointer table with respect to said addresses from which the data is transferred at the beginning time;
   providing address tables of input and output sides corresponding to said pointer table in said respective programmable controllers; and
   linking required areas of said master controller with those of said programmable controllers in accordance with said pointer table and said address tables thereby to transfer the data to said respective programmable controllers.

2. The linking method according to claim 1, wherein said master controller is specifically selected out of said programmable controllers.

3. The linking method according to claim 2, wherein said programmable controllers respectively include a processing unit which carries out data processing by using a micro processor, a switching unit controlled by said processing unit, a receiver which receives the data from said master controller and/or another programmable controllers and inputs into said processing unit, and a transmitter which receives the data from said processing unit and transmits to said master controller and/or other programmable controllers through said switching unit.

4. The linking method according to claim 3, wherein said processing unit in said programmable controllers comprises a first CPU which controls data transfer between said processing unit and said master controller, a second CPU which controls data transfer between said processing unit and a unit to be controlled, a RAM which is connected to said first and second CPUs through a bus line, and a sequence memory which stores a program with respect to said processing unit and which is connected to said second CPU.

5. The linking method according to claim 4, wherein said processing unit further includes a buffer memory which transmits and receives the data and instructs an operation between said second CPU and said unit to be controlled.

6. The linking method according to claim 4, wherein said RAM includes an input area for storing the data transferred from other programmable controllers and an output area for storing the data of a programmable controller to be subjected.

7. The linking method according to claim 2, wherein said master controller includes said edited link table, and further provides a processing unit which carries out data processing by using a micro processor, a receiver which receives the data from said programmable controllers and inputs into said processing unit, and a transmitter which receives the data from said processing unit and transmits to said programmable controllers.

8. The linking method according to claim 1, wherein said link tables are prepared prior to the starting of said linking operation.

9. The linking method according to claim 8, wherein said respective link tables has a transfer origin and a transfer destination with respect to input and output sides.

10. The linking method according to claim 1, wherein said edited link table has areas of pointers for designating an address of an area into which is stored data to be accessed and a pointer table consisting of binary information of the pointers.

11. The linking method according to claim 10, wherein said programmable controllers further respectively provide an input side address table and an output side address table in accordance with an input side pointer table and an output side pointer table of said master controller.

12. The linking method according to claim 1, wherein said inner elements are relays.

13. The linking method according to claim 1, wherein the connection of said master controller and said programmable controllers is performed by using optical fibers through the inner elements.

14. The linking method according to claim 1, wherein said edited link table is prepared by combining first addresses of said programmable controllers to which the data are transferred and second addresses which are commonly provided in said programmable controllers as transfer origins in accordance with the order of the first addresses.

* * * * *